United States Patent [19]

Ames et al.

[11] Patent Number: 5,400,429
[45] Date of Patent: Mar. 21, 1995

[54] METHOD FOR MAKING FIBER-OPTIC BUNDLE COLLIMATOR ASSEMBLY

[75] Inventors: Gregory H. Ames, Gales Ferry; Thomas J. Gryk, Windham, both of Conn.

[73] Assignee: The United States of America as represented by the Secretary of the Navy, Washington, D.C.

[21] Appl. No.: 287,028

[22] Filed: Aug. 8, 1994

[51] Int. Cl.[6] .................................................. G02B 6/36
[52] U.S. Cl. ...................................... 385/147; 385/78; 385/33
[58] Field of Search ................. 385/74, 78, 35, 900, 385/64, 82, 54, 174, 33

[56] References Cited

U.S. PATENT DOCUMENTS

| | | | |
|---|---|---|---|
| 4,123,139 | 10/1978 | Sandahl | 385/59 |
| 5,210,815 | 5/1993 | Alexander et al. | 385/74 |

FOREIGN PATENT DOCUMENTS

| | | | |
|---|---|---|---|
| 53-129057 | 11/1979 | Japan | 385/59 |
| 58-196513 | 11/1983 | Japan | 385/59 |

*Primary Examiner*—Rodney B. Bovernick
*Assistant Examiner*—John Ngo
*Attorney, Agent, or Firm*—Michael J. McGowan; Prithvi C. Lall; Michael F. Oglo

[57] ABSTRACT

A method for making a fiber-optic bundle collimator assembly, comprising the steps of assembling side by side a multiplicity of first bodies of cylindrical configuration and equal diameter and applying uniform compressive force to the first bodies to force the first bodies into a predictable hexagonal pattern of minimum diameter. Additional bodies of cylindrical configuration and having diameters equal to the diameters of the first bodies are inserted on each of the sides of the bundle of first bodies with each of the additional bodies abutting two of the first bodies. A plurality of the first bodies is then removed from the bundle. Each of the removed first bodies is replaced with a pair of cylindrically-shaped second bodies having diameters equal to the diameters of the first bodies, with one of the pair protruding from the bundle on a first face thereof and another of the pair protruding from the bundle on a second face thereof. A clamp is applied to exposed portions of the second bodies at one of the bundle first and second faces, to force the second bodies into an attitude parallel to each other, the second bodies causing the first bodies to align parallel to the second bodies and parallel to each other. An outer ring of the first bodies is locked in place and a second plurality of first bodies is removed from the bundle. A plurality of optical fiber bearing ferrules is inserted in the place of the removed first bodies.

9 Claims, 4 Drawing Sheets

METHOD FOR MAKING FIBER-OPTIC BUNDLE COLLIMATOR ASSEMBLY

STATEMENT OF GOVERNMENT INTEREST

The invention described herein may be manufactured and used by or for the Government of the United States of America for governmental purposes without payment of any royalties thereon or therefor.

CROSS-REFERENCE TO RELATED PATENT APPLICATIONS

This patent application is co-pending with two related patent application Ser. Nos. 08/287,029, entitled Fiber-Optic Bundle and Collimator Assembly (Navy Case 76173), now U.S. Pat. No. 5,394,493, and Fiber-Optic Rotary Joint With Bundle Collimator Assemblies (Navy Case 76172), Ser. No. 08/287,027.

BACKGROUND OF THE INVENTION (1) Field of the Invention

The invention relates to the transmission of fiber-optic signals and is directed more particularly to a method for making a fiber-optic bundle collimator assembly.

(2) Description of Prior Art

A variety of fiber-optic applications requires that the output from a first bundle of fibers be converted into collimated beams which usually are coupled into a second bundle of fibers. Such coupling is typically referred to as "expanded beam coupling", and requires alignment of pairs of beams in a high precision manner. It has been customary in coupling of multiple fibers, to align each pair of opposing optical fibers individually, requiring complex and time-consuming operations. There is thus a need for a fiber-optic collimator assembly which includes a multiplicity of fibers precisely co-parallel, such that alignment of two opposing fibers simultaneously aligns each of the precision fibers in two such assemblies.

SUMMARY OF THE INVENTION

In Navy Case No. 76173, Ser. No. 08/287,029, now U.S. Pat. No. 5,394,493, referred to above and filed concurrently herewith, there is disclosed a fiber-optic bundle collimator in which a multiplicity of fibers are formed into an array in which the collimator beams emitting from the fibers are parallel, facilitating relatively quick and easy alignment of all of the fibers of the assembly with similarly disposed fibers in a complementary assembly.

An object of the invention is to provide a method for making a fiber-optic collimator assembly of the type described in the above-referenced copending application entitled Fiber Optic Bundle and Collimator Assembly (Navy Case 76173) Ser. No. 08/287,029, now U.S. Pat. No. 5,394,493.

With the above and other objects in view, as will hereinafter appear, a feature of the present invention is the provision of a method for making a fiber-optic bundle collimator assembly, the method comprising the steps of assembling side by side a multiplicity of first bodies of substantially cylindrical configuration and equal diameter and applying uniform compressive force to the assembly of first bodies to force the first bodies into a predictable hexagonal pattern of minimum diameter. Additional bodies of substantially cylindrical configuration and having diameters equal to the diameters of the first bodies are inserted on each of the six sides of the bundle of first bodies with each of the additional bodies abutting two of the first bodies. A plurality of the first bodies is then removed from the bundle. Each of the removed first bodies is replaced with a pair of substantially cylindrically shaped second bodies having diameters equal to the diameters of the first bodies, with one of the pair protruding from the bundle on a first face thereof and another of the pair protruding from the bundle on a second face thereof. A clamp is applied to exposed portions of the second bodies at one of the bundle first face and the bundle second face, to force the second bodies into a attitude parallel to each other, the second bodies causing the first bodies to align parallel to the second bodies and parallel to each other. An outer ring of the first bodies is locked in place and a second plurality of first bodies is removed from the bundle. A plurality of optical fiber bearing ferrules is then inserted in the place of the removed first bodies.

The above and other features of the invention, including various novel details of construction and combination of parts, will now be more particularly described with reference to the accompanying drawings and pointed out in the claims. It will be understood that the particular method embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 2:
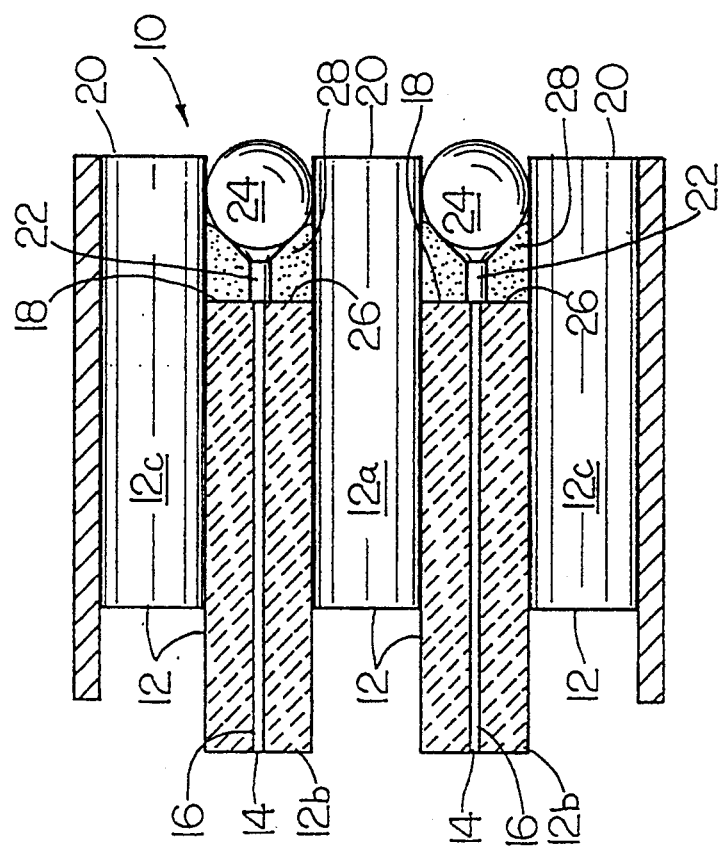
FIG. 2 is a generally sectional view, taken along line II—II of FIG. 1
Figure 1:
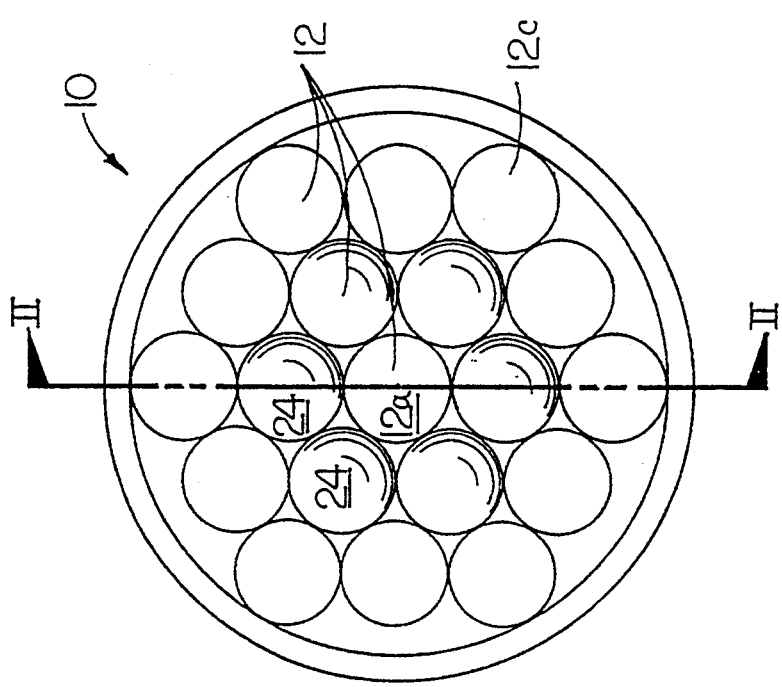
FIG. 1 is an end view of a fiber-optic bundle collimator.

Referring to FIGS. 1 and 2, it will be seen that an illustrative embodiment of a fiber-optic bundle collimator 10 of the type made by the method herein includes nineteen precision cylindrical first bodies 12. Preferably, the bodies 12 are ceramic ferrules of the type currently used in fiber-optic connectors and are made with great accuracy and at low cost. The nineteen ferrule array comprises a central ferrule 12a and two concentric hexagonal rings of ferrules.

The six ferrules 12b of the inner ring contain optical fibers 14 which are epoxied into their respective central tubes 16. The faces 18 of the ferrules 12b are polished and recessed from a first face 20 of the assembly. Spacers 22 and spherical optical lenses 24 are disposed in pockets 26 established by the recession of the six ferrules 12b. The spherical-optical lenses 24 are made from glass or other optically transparent material and are fabricated with precision diameter and roundness. The spherical-optic lenses 24 are precisely the same diameter as the ferrules 12b. An optical interference coating may be applied to the lenses 24 to reduce backreflection.

The spacers 22 establish separation between ferrule face 18, and therefore fiber 14, and spherical lens 24. The separation is critical to providing a correctly collimated bean at the output of the spherical lens 24. It is known that there is an optimum separation of fiber and lens which provides the lowest optical coupling loss.

Any suitable means for maintaining the arrangement of ferrules 12, lenses 24, and spacers 22 may be employed, for example a potting material 28, such as an epoxy. A preferred material for use between the fiber 14 and the lens 24 is optically transparent epoxy, which reduces optical backreflection of stray light into the input fiber.

The nineteen ferrules 12 comprise a close-packed hexagonal array having a precise location for each ferrule. The spherical optical lenses 24 are precisely the same diameter as the ferrules 12. The center of each optical lens 24 coincides with the axis of the associated recessed ferrule 12b, and therefore coincides with the axis of the optical fiber 14 therein. Any angular defection of a collimated beam which exits the lens 24 relative to the ferrule axis is caused by lateral displacement of the lens center from the fiber center in directions perpendicular to the axis of the lens center. Because of the precise alignment of lens 24 and fiber 14 in the bundle collimator shown in FIGS. 1 and 2, each collimated beam emerges parallel to the ferrule axis. Because all ferrules 12b in the hexagonal array are parallel to each other, all emerging collimated beams are co-parallel.

In assembling the ferrules 12, a uniform force is applied from all sides to a cluster of nineteen ferrules 12 disposed side by side. The force, directed radially inwardly, urges the ferrules 12 into a predictable hexagonal pattern.

While the inwardly-directed force causes the ferrules 12 to assume a hexagonal configuration, such compressive force is not always sufficient to preclude twisting of ferrules about the center of the bundle. Twist results in output beams that twist in space.

Figure 3:
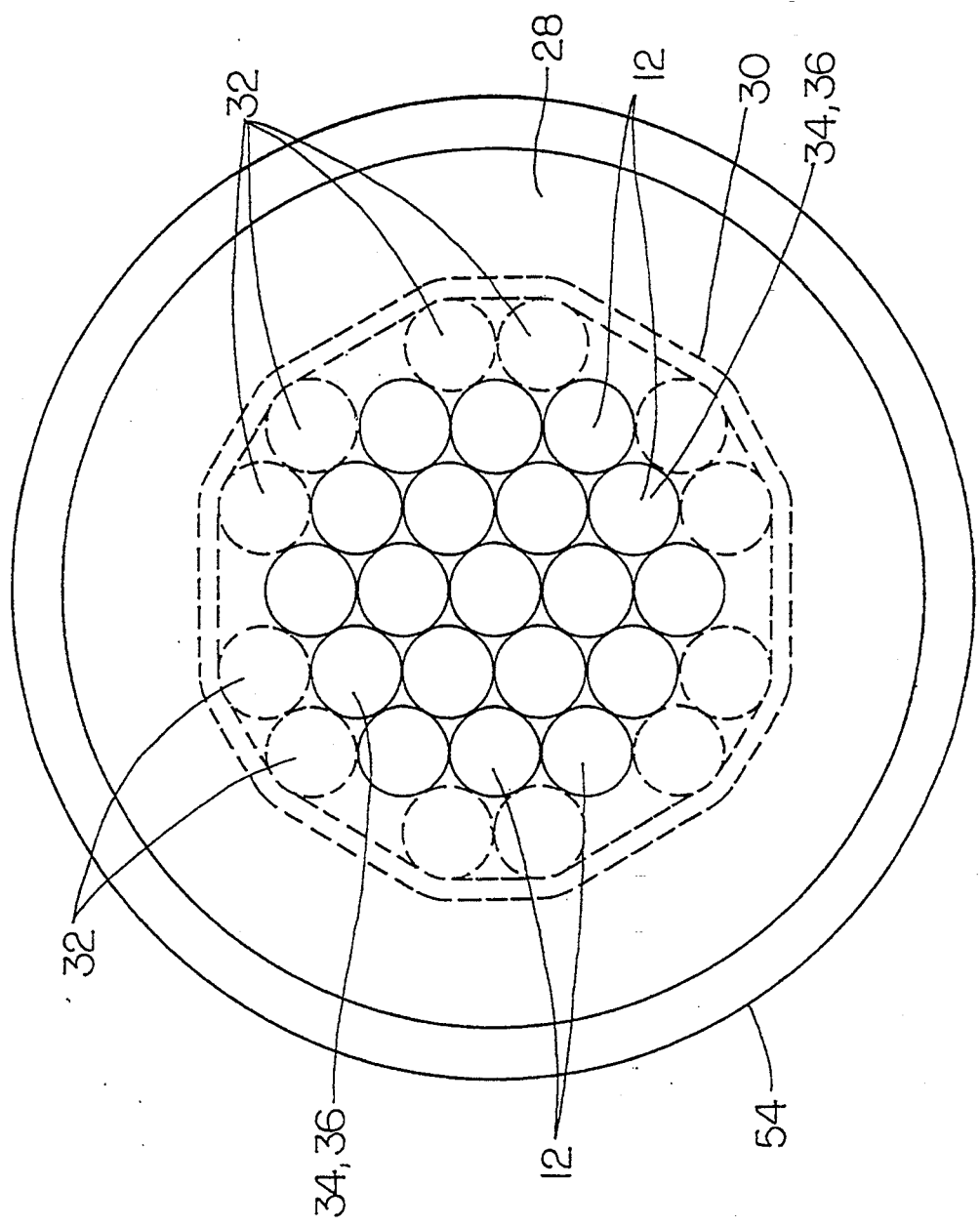
FIG. 3 is an end view similar to FIG. 1, but illustrative of two steps in the inventive method.
Figure 4:
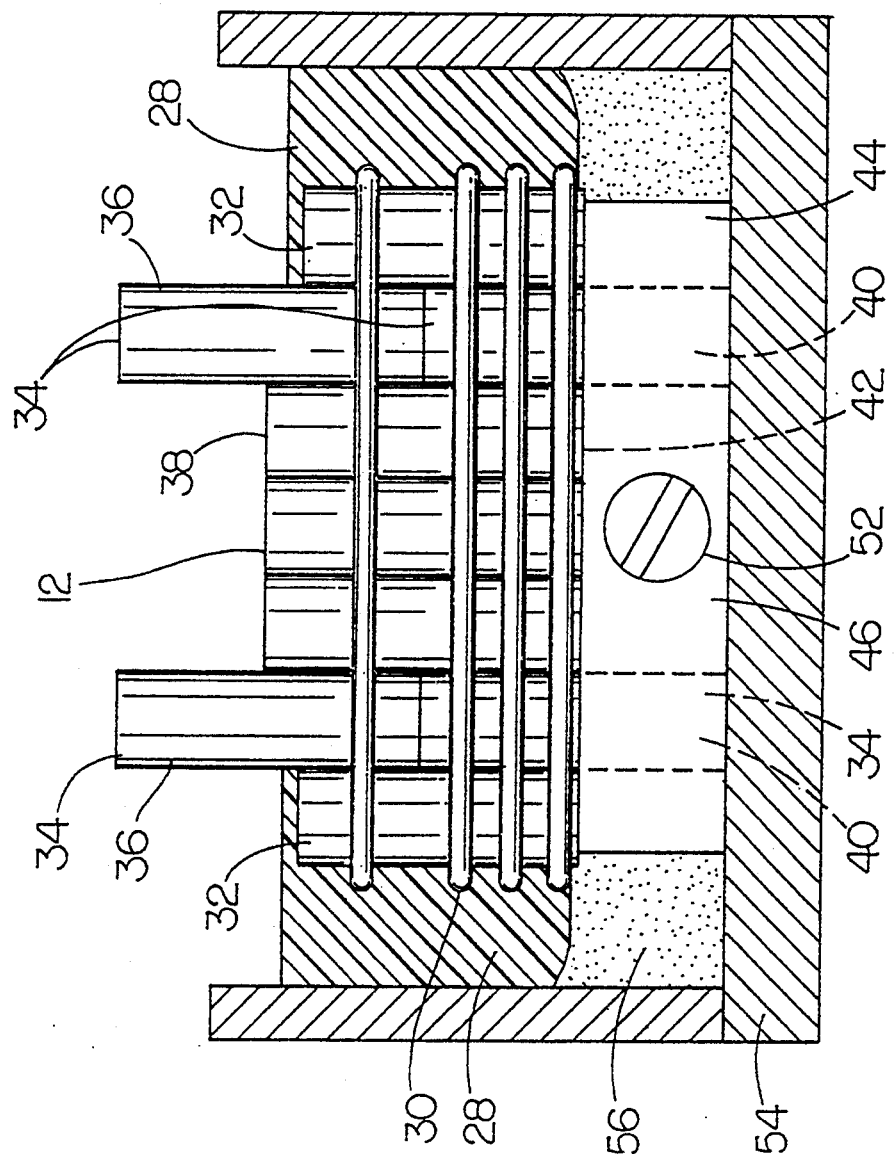
FIG. 4 is a side elevational view of a further step in the inventive method.
Figure 5:
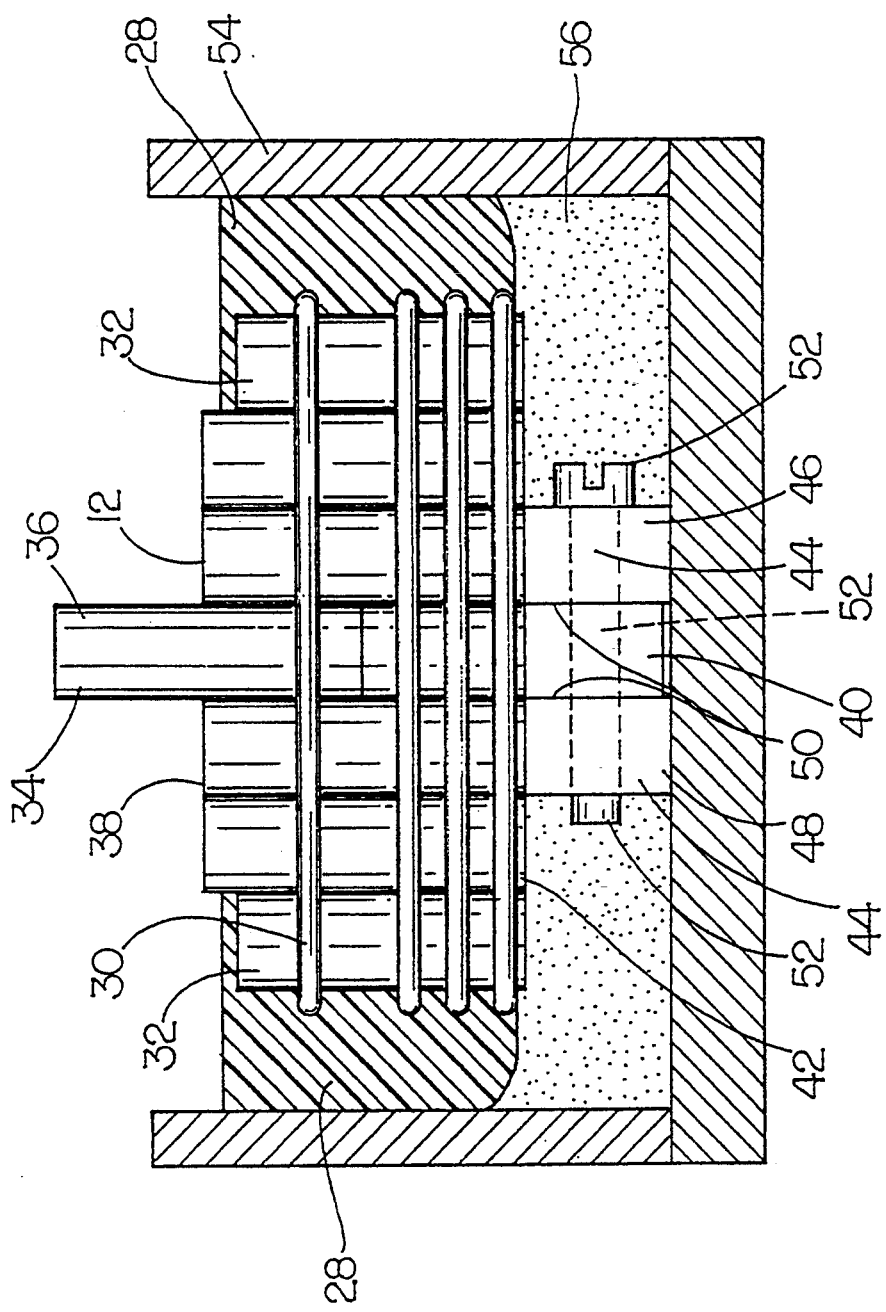
FIG. 5 is a side elevational view of a still further step in the inventive method, the side shown in FIG. 5 being 90° to the side shown in FIG. 4

A method of assembling a group of ferrules 12 in such a manner as to avoid twist is illustrated in FIG. 3–5. Referring to FIG. 3, it will be seen that in the illustrative embodiment, nineteen of the precision ceramic ferrules 12 are grouped in a bundle by one or more elastomeric compressive members, preferably a number of elastomeric O-rings 30, which serve to apply the inwardly-directed force required to compress the ferrules into their predictable array. Additional bodies 32, preferably ferrules similar to ferrules 12, but of shorter length (FIG. 4), are inserted between the outermost first bodies 12 and the O-rings 30 on each of the six sides of the array of ferrules. Each of the additional ferrules 32 abuts two of the first bodies 12 and provides a positive force holding the middle of each side of the hexagon of ferrules in place.

Two of the ferrules 12, preferably ferrules in the outer ring of first body ferrules, are removed and each removed ferrule is replaced by an end-to-end pair of second bodies 34, which preferably are ferrules substantially identical to the ferrules 12 comprising the first bodies. A portion 36 of each pair of ferules 34 protrudes from a first face 38 of the bundle and a portion 40 protrudes from a second face 42 of the bundle.

A clamp 44, including two halves 46, 48, with highly polished flat faces 50, (FIG. 5) are connected by a threaded member, such as a screw 52, and clamps the protruding portions 40 of the ferrules 34 comprising the second bodies, so as to force the ferrule portions 40 into a parallel relationship and remove any twist that may be present.

Potting material 28 is then applied to solidify the bundle. The illustrative method for applying the potting material includes provision of a mold 54. The bundle of ferrules is placed in mold 54 and a wax 56 is introduced into the mold to cover the clamp 44 and the second face 42 of the assembly. Epoxy, or other potting material 28, is poured around the exterior of the bundle and allowed to harden in the mold 54, after which the wax 56 and clamp 44 are removed. The internal seven ferrules are then removed, leaving a hexagonal ring of twelve ferrules 12c.

The six ferrules 12b containing optical fibers 14 epoxied therein are inserted into the hexagonal ring formed by the twelve ferrules 12c, along with the central ferrule 12a, which is a non-fiber optic bearing ferrule. The six fiber-optic ferrules 12b are, as noted above, recessed from the first face 20 of the assembly. The spacers 22 and spherical lenses 24 are inserted into the pockets 26.

There is thus provided a collimator assembly in which all beams are precisely parallel and, therefore, an assembly which may be coupled to another identical assembly relatively easily. Because the bundle of beams is co-parallel, all fiber channels may be aligned simultaneously through a single set of adjustments, rather than each pair having to be aligned independently.

The above and other features of the invention, including various novel details of construction and combination of parts, will now be more particularly described with reference to the accompanying drawings and pointed out in the claims. It will be understood that the particular method embodying the invention is shown by way of illustrations only and not as a limitation of the invention. The principles and features of this invention may be employed in various and numerous embodiments without departing from the scope of the invention. For example, while the embodiment illustrated and described herein includes six optical fibers, the same method may be applied to larger bundles. An array with an additional ring of eighteen ferrules allows an optical fiber to be placed in the center position and in each of twelve positions of a second ring, for a total of thirteen fibers.

What is claimed is:

1. A method for making a fiber-optic bundle collimator assembly, said method comprising the steps of:

assembling side by side a multiplicity of first bodies of substantially cylindrical configuration and of equal diameter;

applying uniform compressive force to the assembly of first bodies to force said first bodies into a predetermine hexagonal pattern;

inserting additional bodies of substantially cylindrical configuration and having diameters equal to said diameters of said first bodies on each of the six sides of said bundle of first bodies, each of said additional bodies abutting two of said first bodies;

removing a plurality of said first bodies from said bundle;

replacing each of said removed first bodies with a pair of substantially cylindrically shaped second bodies having diameters equal to the diameters of said first bodies, one of each of said pair protruding from said bundle on a first face thereof and another of said pair protruding from said bundle on a second face thereof;

applying a clamp to expose portions of said second bodies at one of said bundle first face and said bundle second face, to force said second bodies into an attitude parallel to each other, said second bodies causing said first bodies to align parallel to said second bodies and parallel to each other;

locking an outer ring of said first bodies in place, removing a second plurality of said first bodies from said bundle, and inserting in the place of said second plurality of first bodies a plurality of optical fiber bearing ferrules.

2. The method in accordance with claim 1 wherein said application of compressive force to said assembly of first bodies is accomplished by an elastomeric compressive member.

3. The method in accordance with claim 2 wherein said elastomeric compressive member comprises at least one o-ring.

4. The method in accordance with claim 2 wherein said additional bodies are of lesser length than are said first bodies.

5. The method in accordance with claim 4 wherein said additional bodies are inserted within said compressive member.

6. The method in accordance with claim 1 wherein said clamp comprises first and second clamp halves connected by a threaded member.

7. The method in accordance with claim 6 wherein said locking of said outer ring of said first bodies in place is accomplished by application of a potting material to said first bodies, said additional bodies, and a portion of said second bodies.

8. The method in accordance with claim 7 wherein said second plurality of said first bodies which is removed from said bundle includes a central first body and one ring of first bodies around said central first body.

9. The method in accordance with claim 1 wherein said optical fiber bearing ferrules are recessed from said bundle first face and including the additional steps of inserting a spacer and a lens in each pocket formed by said recession of said optical fiber bearing ferrules, such that said spacer interconnects an optical fiber and said lens.

* * * * *